US007992602B1

(12) United States Patent
Guenther

(10) Patent No.: US 7,992,602 B1
(45) Date of Patent: Aug. 9, 2011

(54) DEVICE, KIT AND METHOD FOR ADDING SALT TO A WATER SOFTENER SYSTEM

(76) Inventor: Robert F. Guenther, Dexter, MI (US)

( * ) Notice: Subject to any disclaimer, the term of this patent is extended or adjusted under 35 U.S.C. 154(b) by 1122 days.

(21) Appl. No.: 11/800,316

(22) Filed: May 4, 2007

(51) Int. Cl.
*B65B 39/00* (2006.01)
*B67D 7/06* (2010.01)

(52) U.S. Cl. ....... 141/340; 141/98; 141/334; 222/181.2; 222/185.1

(58) Field of Classification Search .............. 141/98, 141/334, 340; 222/181.1–181.3, 185.1, 187, 222/189.6, 413, 460, 462; 221/187
See application file for complete search history.

(56) References Cited

U.S. PATENT DOCUMENTS

| 1,510,288 | A | * | 9/1924 | Malone | 193/34 |
| 3,980,166 | A | * | 9/1976 | de Feudis | 193/34 |
| 4,987,988 | A | * | 1/1991 | Messina et al. | 193/2 R |
| 5,151,000 | A | * | 9/1992 | Geraghty et al. | 414/187 |
| 5,215,127 | A | * | 6/1993 | Bergeron | 141/10 |
| 5,253,766 | A | * | 10/1993 | Sims | 209/702 |
| 5,349,997 | A | * | 9/1994 | Rial | 141/331 |
| 5,996,852 | A | * | 12/1999 | Johnson | 222/181.2 |
| 6,561,387 | B1 | * | 5/2003 | Slawson | 222/181.1 |
| 2008/0035675 | A1 | * | 2/2008 | Norman | 222/181.3 |

* cited by examiner

*Primary Examiner* — Timothy L Maust
(74) *Attorney, Agent, or Firm* — David J. Wilson

(57) ABSTRACT

The present invention relates to devices, kits and methods to aid the home owner in the transport of salt to their cellar-based water softening system. The device of the present invention uses rectangular piping because of the greater ease of supporting the piping and greater stability during use.

4 Claims, 2 Drawing Sheets

DEVICE, KIT AND METHOD FOR ADDING SALT TO A WATER SOFTENER SYSTEM

BACKGROUND OF INVENTION

Home owners often times have to have water softening systems to treat "hard" water.

Water is called "hard" if it has a lot of calcium or magnesium dissolved in it. Hard water causes two problems. First, it can cause "scale" to form on the inside of pipes, water heaters, tea kettles and so on. The calcium and magnesium precipitate out of the water and stick to things. The scale doesn't conduct heat well and it also reduces the flow through pipes. Eventually, pipes can become completely clogged.

Second, it reacts with soap to form a sticky scum and also reduces the soap's ability to lather. Since most of us like to wash with soap, hard water makes a bath or shower less productive as well as making the cleaning of clothes and other household items more difficult.

The solution to hard water is either to filter the water by distillation or reverse osmosis to remove the calcium and magnesium or to use a water softener. Filtration would be extremely expensive to use for all the water in a house so a water softener is usually a less costly solution.

The idea behind a water softener is simple. The calcium and magnesium ions in the water are replaced with sodium ions. Since sodium does not precipitate out in pipes or react badly with soap, both of the problems of hard water are eliminated. To accomplish the ion replacement, the water in the house runs through a bed of small plastic beads or through a matrix called zeolite. The beads or zeolite are covered with sodium ions. As the water flows past the sodium ions, they swap places with the calcium and magnesium ions. Eventually, the beads or zeolite contain nothing but calcium and magnesium and no sodium and at this point they stop softening the water. It is then time to regenerate the beads or zeolite.

Regeneration involves soaking the beads or zeolite in a stream of sodium ions. Salt is sodium chloride, so the water softener mixes up a very strong brine solution and flushes it through the zeolite or beads (this is why you load up a water softener with salt). The strong brine displaces all of the calcium and magnesium that has built up in the zeolite or beads and replaces it again with sodium. The remaining brine plus all of the calcium and magnesium is flushed out through a drain pipe. Regeneration can create a lot of salty water, by the way—something like 25 gallons (95 liters).

Zeolite is basically hydrated alumino-silicate minerals with an "open" structure that can accommodate a wide variety of cations, such as $Na^+$, $K^+$, $Ca^{2+}$, $Mg^{2+}$ and others. These positive ions are rather loosely held and can readily be exchanged for others in a contact solution. Some of the more common mineral zeolites are: analcime, chabazite, heulandite, natrolite, phillipsite, and stilbite. An example mineral formula is: $Na_2Al_2Si_3O_{10} \cdot 2H_2O$, the formula for natrolite.

Home based water softening systems are often located in the cellar. Home owners thus face the task of having to bring 50 pound bags of salt to the cellar periodically. As can be appreciated, this task can be difficult for some persons. Therefore, what is needed are device, kits and methods useful for aiding homeowners in the task of bringing salt to the cellar for use with water softening systems.

SUMMARY OF INVENTION

The present invention relates to devices, kits and methods to aid the home owner in the transport of salt to their cellar-based water softening system.

In one embodiment, the device of the present invention comprises a series of rectangular piping designed to be incorporated into the wall of a dwelling (e.g., passes through the wall of the building) or other part of a building such as a window, foundation, etc. For clarity and brevity, the part of the building where the device of the present invention passes through the building will be referred to as the wall of the building although it is contemplated by the present invention that the device may pass through other parts of the building, as described above. The first end of the rectangular piping is located outside of the home and ends in a removable rectangular shaped funnel. The removable funnel also comprises a cover. The second end of the rectangular piping of the device ends at the water softener system. This device allows a home owner to pour the salt into the water softener system from outside the house rather than having to carry the full bag of salt down into the cellar.

One advantage to using rectangular piping is that it is easier support than prior art systems that use round tubing since the rectangular piping has a large flat surface that is to be positioned on the support mechanism. Another advantage is that the rectangular piping is more stable when supported, an advantage when persons often time use the piping system to support the salt bag as they pour the salt into the device. The inventor knows of no other water softener salt transport device that utilizes rectangular piping.

The rectangular piping of the present invention may be made of any suitable material. In a preferred embodiment, the rectangular piping of the present invention is made of PVC (polyvinyl chloride) type plastic because of its weather resistance and durability. The rectangular piping of the present invention is made to interconnect with adjoining pieces of piping. In one embodiment, this is done by having the first end of first piece of piping enlarged such that the second end of the adjoining (second) piece of piping can be inserted into the first end of the first piece of piping. The piping can then, in another embodiment, be sealed with, for example, adhesives or heat.

In another embodiment of the present invention, the device of the present invention also comprises a material suitable for placing in the wall of the building where the device of the present invention passes thorough the wall. For example, a sleeve of material (such as sheet metal, plastic, rubberized foam, etc.) may be used to protect the wall of the building from the piping, protect the wall of the building from rain or insects from getting into the wall of the building and prevent the exchange of air between the outside of the building and the interior of the building (i.e., act as an insulator). The device is not limited to any particular material or materials and many are suitable. Non-limiting examples include, metal or plastic sleeves shaped to accept the rectangular piping of the present invention (which may or may not incorporate a lip that can be placed external to the building to prevent the sleeve from moving and to allow the application of sealant where the sleeve meets the exterior wall of the building), expanding spray foam, preformed foam sleeves, liquid or semi-liquid chalking, etc.

In another embodiment, the present invention also comprises supports for the device. In one embodiment, the supports comprise brackets that attach to the exterior (outside) wall or interior wall of the building. Suitable brackets are known in the art. In another embodiment, the supports may comprise, either in combination with or alone, brackets that attach or rest on the ground outside the building. These supports may be made of any suitable materials but preferred materials are PVC and/or metal.

In one embodiment, the funnel of the device of the present invention comprises a rectangular end designed and sized to interconnect with the rectangular piping of the invention. The present invention does not limit the shape of the other end of the funnel and, preferably, the other end of the funnel is wide enough to allow salt to be easily pored into the water softener system. Non-limiting shapes include, half circles, triangles, squares and rectangles.

In one embodiment, the present invention also comprises a connector piece for connecting the rectangular piping of the present invention to the water softener system. The connector piece of the present invention has a first end shaped and sized to interconnect with the rectangular piping of the present invention and a second end shaped and sized to connect with the water softener system onto which the device of the present invention will be installed.

The present invention, in another embodiment, is a kit that comprises, for example, i) a plurality of rectangular piping, which includes both straight and angled pieces, that are designed to interconnect with adjourning pieces of the rectangular piping, ii) a funnel with a rectangular end designed to interconnect with the rectangular piping of the kit, iii) a cover sized to fit the top of the funnel, iv) a set of instructions comprising directions for the installation of the kit of the present invention into the wall of a building and, optionally, v) one or more brackets for attaching the assembled device of the kit of the present invention to the outside wall of the building and/or for supporting the device of the present invention off the ground and, vi) a sleeve designed and sized to protect the building where the device of the present invention passes through the wall of the building, the sleeve, in some embodiments, also serving to insulate the building from drafts created by air passing around the piping of the present invention.

In another embodiment, the present invention comprises a method of delivering salt to a water softener device located, for example, in the cellar of a building. The method comprises, for example, i) installing the device of the present invention into the wall of the building, ii) bringing to the funnel of the device a bag of salt for use in a water softener system, iii) opening the bag of salt and lifting or otherwise bringing the bag of salt to the funnel of the device and iv) pouring the salt from the bag into the funnel of the device.

One embodiment of the present invention contemplates a device for aiding a person in adding salt to a water softener system, the device comprising: a plurality of rectangular piping comprising straight and angled portions, said piping assembled to allow a first straight portion to be substantially vertical and substantially parallel to an outside wall and a second straight portion to be substantially vertical and substantially parallel to an interior wall and the angled portions assembled to create an diagonal portion through the vertical wall thereby connecting the portion substantially parallel to the outside wall with the portion substantially parallel to the interior wall wherein the portion of the rectangular piping substantially parallel to the outside wall is higher that the portion of the rectangular piping substantially parallel to the interior wall; a funnel comprising a first and a second end, the first end of which is generally rectangular shaped sized to interconnect with the end of the portion of rectangular piping substantially parallel to the outside wall; a cover sized to fit the top of said funnel; and, an adapter piece comprising two ends, the first end sized to attach to the end of a piece of rectangular piping and the second end sized to attach to an opening on the water softener system for adding salt to said system.

In another embodiment, the device comprises a means for reversibly securing the funnel cover to the funnel.

In another embodiment, the device also comprises one or more means for securing the rectangular piping to the outside and interior walls.

In another embodiment, the size of the rectangular piping, as measured in a cross section the rectangular piping, is between approximately 9 and 40 square inches and more preferably between approximately 12 and 20 square inches.

In another embodiment, the device also comprises material for supporting the angled piping where it transverses the wall of a building. In a preferred embodiment the also aids in insulating the cellar and/or protects the wall of the building.

In another embodiment, the device also comprises materials for supporting the portion of the device exterior to the building off the ground.

In one embodiment, the present invention contemplates a kit suitable for assembling a device to aid a person in adding salt to a water softener system, comprising: a plurality of straight and angled rectangular piping, said piping designed to interconnect with the other pieces of the rectangular piping of said kit; a rectangular funnel sized to fit onto the rectangular piping of step a.; a cover sized to fit the funnel of step b.; an adapter designed to attach the rectangular piping of step a. with a water softener system; a set of instructions directing the user how to install the device to aid a person in adding salt in a water softener system in a building.

In another embodiment, the kit additionally comprises a material suitable for supporting said angled piping wherein passes through the wall of a building.

Other features and advantages of the invention will be apparent from the following description.

DETAILED DESCRIPTION OF PREFERRED EMBODIMENTS

The invention will now be described in detail with reference to a few preferred embodiments, as illustrated in accompanying drawings. In the following description, numerous specific details are set forth in order to provide a thorough understanding of the invention. However, it will be apparent to one skilled in the art that the invention may be practiced without some or all of these specific details. In other instances, well-known features and/or process steps have not been described in detail in order to not unnecessarily obscure the invention. The features and advantages of the invention may be better understood with reference to the drawings and discussions that follow.

While the invention has been described with respect to a limited number of embodiments, those skilled in the art, having benefit of this disclosure, will appreciate that other embodiments can be devised which do not depart from the scope of the invention as disclosed herein.

Figure 1:
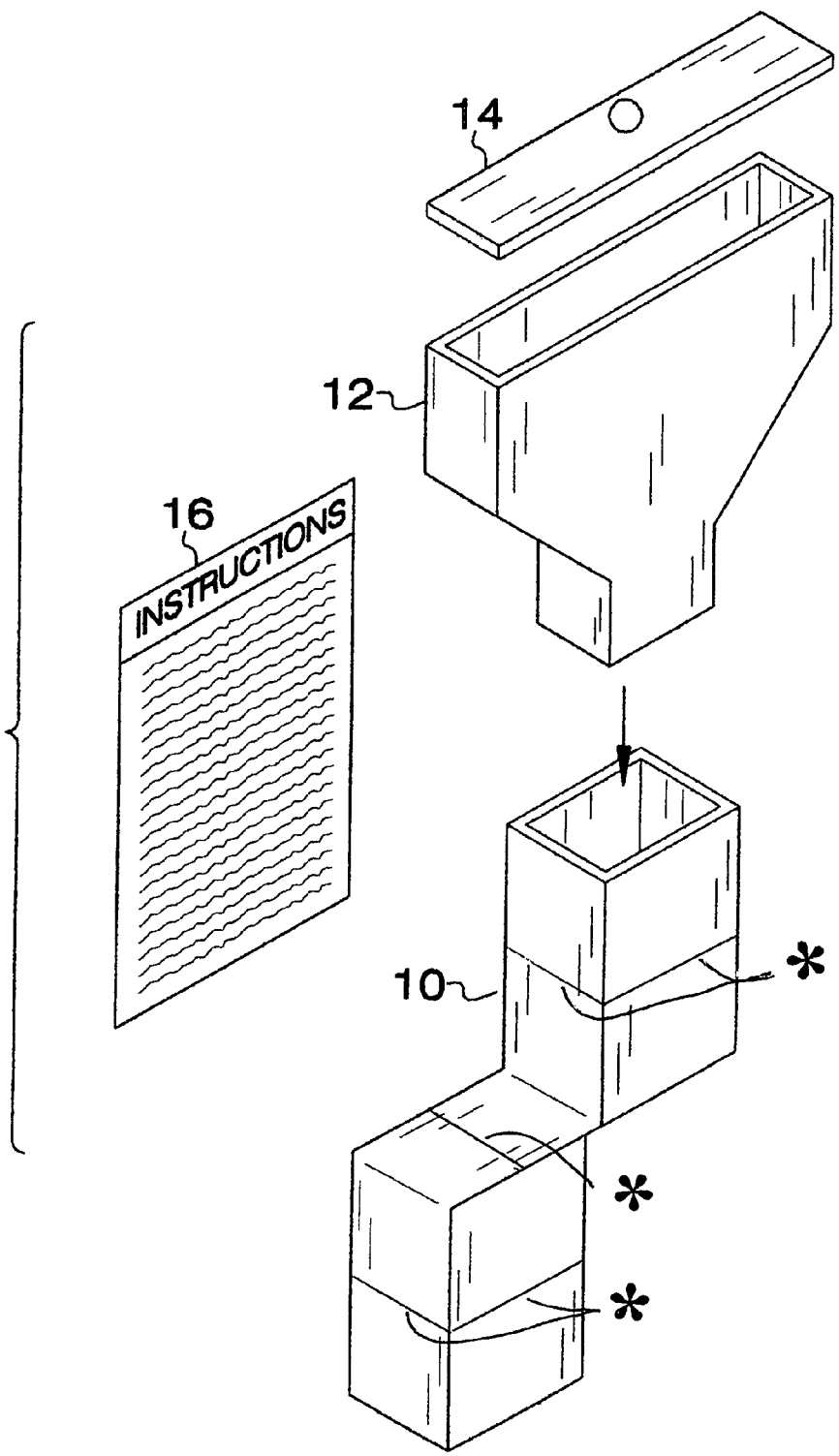
FIG. 1 shows one embodiment of a kit comprising exemplary components of the device of the present invention. Asterisks (*) denote solid lines which indicate the juncture of two pieces of rectangular piping.

As shown in FIG. 1, one embodiment of the device of the present invention comprises a plurality of straight the angular rectangular piping (10). This figure shows several sections interconnected to form the shape that they would assume when assembled in the wall of a building. The asterisk (*) indicates where sections have been interconnected. This figure also shows the funnel (12) comprising a rectangular end sized to by interconnected with the rectangular piping of the device and the cover of the funnel (14). Also shown in this figure are instructions (16) that would be included in a kit for assembling the device.

Figure 2:
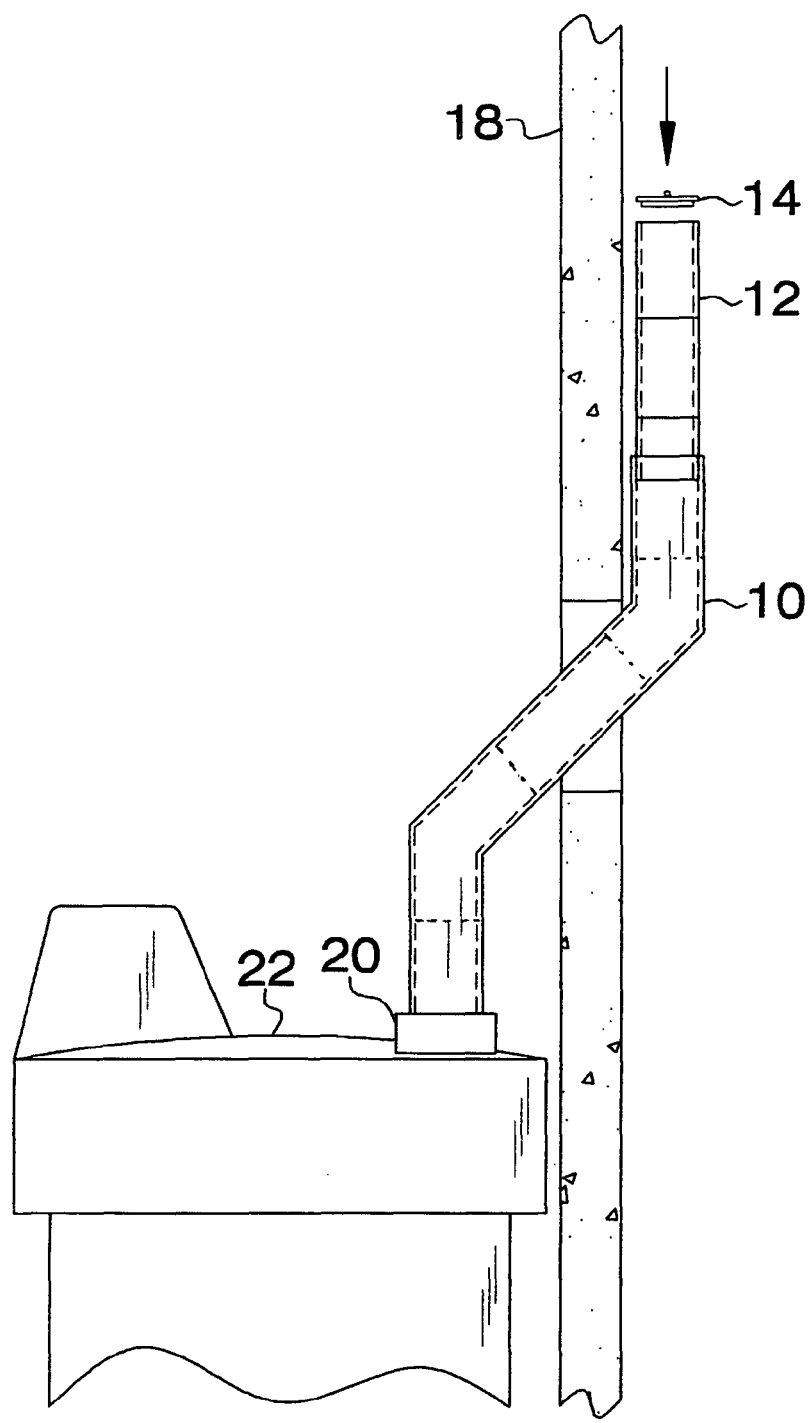
FIG. 2 shows one embodiment of the device of the present invention installed in a wall of a building. Dashed lines located in the piping and perpendicular to direction of the rectangular piping (across the piping) indicate the juncture of two pieces of rectangular piping.

FIG. 2 shows one embodiment of the device of the present invention installed in a building. The rectangular piping of the device (10) is shown transversing (going through) a wall (18). The funnel (12) and cover (14) are shown. Also shown are the water softener system (22) and a connector piece (20) for connecting the device of the present invention to the water softener system.

What is claimed is:

1. A device for aiding a person in adding salt to a water softener system, consisting of:
   a. a plurality of rectangular piping composed of straight and angled portions, said piping assembled to allow a first straight portion to be substantially vertical and substantially parallel to an outside wall and a second straight portion to be substantially vertical and substantially parallel to an interior wall and the angled portions assembled to create a diagonal portion through the vertical wall thereby connecting the portion substantially parallel to the outside wall with the portion substantially parallel to the interior wall wherein the portion of the rectangular piping substantially parallel to the outside wall is higher than the portion of the rectangular piping substantially parallel to the interior wall, wherein said device also consists of one or more means for securing the rectangular piping to the outside and interior walls, wherein said device also consists of material for supporting the angled piping where it transverses the wall of a building and, where in said device also consists of materials for supporting the portion of the device exterior to the building off the ground;
   b. a funnel composed of a first and a second end, the first end of which is generally rectangular shaped sized to interconnect with the end of the portion of rectangular piping substantially parallel to the outside wall;
   c. a cover sized to fit the top of said funnel, wherein said funnel cover also consists of a means for reversibly securing the cover to the funnel; and,
   d. an adapter piece composed of two ends, the first end sized to attach to the end of a piece of rectangular piping and the second end sized to attach to an opening on the water softener system for adding salt to said system.

2. The device of claim 1, wherein a cross section of said rectangular piping is between approximately 10 and 20 square inches.

3. The material of claim 1, wherein said material also insulates said cellar.

4. The material of claim 3, wherein said material also protects the wall of the building.

* * * * *